(12) United States Patent
Peng

(10) Patent No.: US 11,386,924 B1
(45) Date of Patent: Jul. 12, 2022

(54) HEAT-ASSISTED RECORDING HEAD USING BLUE TO ULTRAVIOLET WAVELENGTH LASER

(71) Applicant: Seagate Technology LLC, Fremont, CA (US)

(72) Inventor: Chubing Peng, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/148,717

(22) Filed: Jan. 14, 2021

(51) Int. Cl.
  G11B 11/105 (2006.01)
  G11B 5/48 (2006.01)
  G11B 5/31 (2006.01)
  G11B 5/00 (2006.01)

(52) U.S. Cl.
  CPC .......... *G11B 5/4866* (2013.01); *G11B 5/3133* (2013.01); *G11B 5/4826* (2013.01); *G11B 2005/0021* (2013.01)

(58) Field of Classification Search
  None
  See application file for complete search history.

(56) References Cited

U.S. PATENT DOCUMENTS

| 7,042,810 | B2 | 5/2006 | Akiyama et al. | |
| 7,171,080 | B2 | 1/2007 | Rausch | |
| 7,961,417 | B2 | 6/2011 | Seigler et al. | |
| 8,300,503 | B2 | 10/2012 | Arai et al. | |
| 8,488,419 | B1* | 7/2013 | Jin | G11B 5/6088 369/13.32 |
| 9,019,803 | B1* | 4/2015 | Jin | G11B 13/08 369/13.33 |
| 9,588,292 | B2* | 3/2017 | Yu | G02B 5/008 |
| 10,403,313 | B1* | 9/2019 | Gan | G02B 6/1226 |
| 10,490,215 | B1* | 11/2019 | Chen | G11B 5/314 |
| 10,770,098 | B1* | 9/2020 | Peng | G11B 5/4866 |
| 11,056,135 | B1* | 7/2021 | Peng | G11B 5/6088 |
| 2011/0141862 | A1* | 6/2011 | Arai | G11B 5/4833 369/13.33 |
| 2012/0281957 | A1* | 11/2012 | Chamanzar | G02B 6/12007 385/131 |
| 2016/0351209 | A1* | 12/2016 | Chen | G11B 5/3133 |
| 2017/0032811 | A1* | 2/2017 | Chen | G11B 5/6082 |
| 2018/0108373 | A1* | 4/2018 | Fernandez Garcia | G02B 6/1228 |

* cited by examiner

*Primary Examiner* — Brian E Miller
(74) *Attorney, Agent, or Firm* — Mueting Raasch Group

(57) ABSTRACT

A recording head has a light source that emits light at a wavelength in a wavelength range of 260 nm to 460 nm inclusive. A slider body of the light source includes a magnetic pole extending to a media-facing surface of the recording head and integrated photonics that deliver the light to a recording medium. The integrated photonics include a waveguide that couples the light from the light source to the media-facing surface of the slider and a near-field transducer coupled to receive the light from the waveguide. The near-field transducer has a surface plasmon plate and a peg extending from the surface plasmon plate. The surface plasmon plate is formed of a first material having a first plasmonic quality factor (Q-factor) above 5 in the wavelength range, the peg formed of a second material having a second Q-factor above 1.2 in the wavelength range.

19 Claims, 15 Drawing Sheets

| | | Near-infrared ($\lambda_0$ = 830 nm) | Blue light ($\lambda_0$ = 400 nm) |
|---|---|---|---|
| Core | Width | 600 | 300 |
| | Thickness | 370 | 150 |
| SPP | bdsc_x | 400 | 100 |
| | bdsc_y | 830 | 300 |
| | hBDSC | 40 | 12 |
| RTD | PCS | 7-9 | 7-9 |
| | HDSC_recess | 30 | 14 |
| | CNS | 30 | 14 |
| | pegBP | 12 | 6 |
| Material | Peg Coupler | Ir | Ru |
| | OSS | Rh | Ru |
| | WGB | Rh or Ru | Ru |

HEAT-ASSISTED RECORDING HEAD USING BLUE TO ULTRAVIOLET WAVELENGTH LASER

SUMMARY

The present disclosure is directed to a heat-assisted recording head using blue to ultraviolet wavelength laser. In one embodiment, a recording head includes a light source that emits light at a wavelength in a wavelength range of 260 nm to 460 nm inclusive. A slider body of the light source includes a magnetic pole extending to a media-facing surface of the recording head and integrated photonics that deliver the light to a recording medium. The integrated photonics include a waveguide that couples the light from the light source to the media-facing surface of the slider and a near-field transducer coupled to receive the light from the waveguide. The near-field transducer has a surface plasmon plate and a peg extending from the surface plasmon plate. The surface plasmon plate is formed of a first material having a first plasmonic quality factor (Q-factor) above 5 in the wavelength range, the peg formed of a second material having a second Q-factor above 1.2 in the wavelength range.

In another embodiment, a recording head includes a light source that emits light at a wavelength in a wavelength range of 260 nm to 460 nm inclusive. A slider body of the recording head has a magnetic pole extending to a media-facing surface of the recording head and integrated photonics that deliver the light to a recording medium. The integrated photonics include a waveguide that couples the light from the light source to the media-facing surface of the slider a near-field transducer coupled to receive the light from the waveguide. The near-field transducer includes a surface plasmon plate and a peg extending from the surface plasmon plate. The peg extending from the surface plasmon plate by a break point distance that facilitates recording at a comparable thermal gradient and lower peg temperature compared to a similarly configured recording head that uses near-infrared light. These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
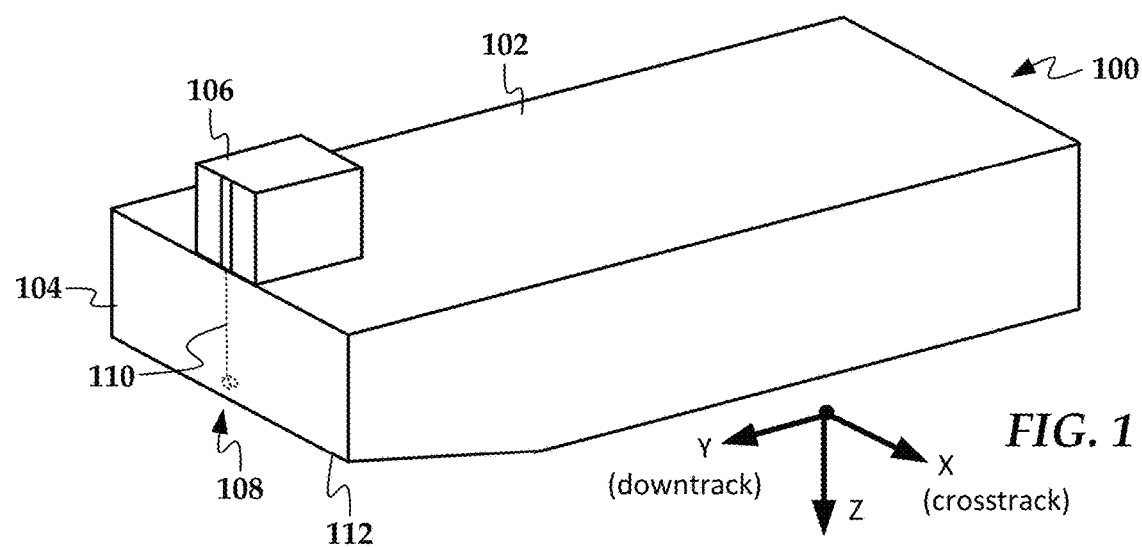
FIG. 1 is a perspective view of a recording head according to an example embodiment.

The present disclosure is generally related to heat-assisted magnetic recording (HAMR), also referred to as energy-assisted magnetic recording (EAMR), thermally-assisted recording (TAR), thermally-assisted magnetic recording (TAMR), etc. In a HAMR device, a near-field transducer (NFT) concentrates optical energy into a sub-100 nm scale optical spot in a recording layer, which raises the media temperature locally, reducing the writing magnetic field required for high-density recording. A waveguide delivers light to and excites the NFT.

The optical energy provided for HAMR recording is generated by a laser diode that is optically coupled to a slider that includes magnetic writing components such as write coil, write pole, return poles, etc. The laser diode can be mounted to the slider (e.g., on a top surface or trailing edge) where an integrated waveguide is coupled to receive light emitted from the slider. Existing HAMR lasers may emit light at a near infrared, e.g., a wavelength $\lambda$ around 830 nm. Laser diodes at this wavelength are widely available and inexpensive, e.g., being used in CD and optical data storage.

Optical components integrated into the HAMR are designed to for optimal efficiency at the near-infrared wavelength of the lasers. For example, gold (Au) is often used for parts of the HAMR NFT as its quality factor of plasmonic resonance (Q) peaks at near-infrared frequencies, giving the NFT high excitation efficiency. While Au has many other desirable physical properties (e.g., high thermal conductivity), its mechanical robustness is lacking, reducing its reliability when used in the harsh environment experienced at the media-facing surface of a recording head. For example, conditions such as high temperature, chemical reaction, and impact with the recording medium can cause an Au NFT to become misshapen over time and/or separate from surrounding materials.

More recent NFT designs have utilized NFTs that incorporate more mechanically robust materials into at least part of the structure. For example, some NFT designs have an enlarged part (e.g., a disk or plate) and a peg extending from the enlarged part towards the media-facing surface. Some designs form the peg from a more mechanically robust metal such as Rh or Ir, while other parts of the NFT away from the ABS (e.g., the disk or plate) can be made of Au to still retain the high-Q advantages of the of this material. The use of two or more materials in an NFT has been found to increase the reliability of the NFT, and which it turn increases the useful life of the recording head in which it is integrated.

In order to provide good HAMR recording performance, the NFT should form a hotspot with a high thermal gradient (TG). Generally, the thermal gradient is the rate of change of temperature as a function of distance at the periphery of the hotspot. A hotspot with a relatively high TG has a higher temperature change over a shorter distance relative to a lower TG, which results in more clearly defined hotspot boundaries. A high TG can improve quality of the recorded data. It has been found that mechanically robust pegs (e.g., Rh or Ir) do not provide TG as high as an Au peg for near-infrared lasers. For example, it has been found that if the Rh or Ir peg is supplied with enough energy to provide the desired TG, the peg temperature rises excessively.

In embodiments described below, a HAMR recording utilizes a light source with shorter wavelengths than the approximate 830 nm currently used. The light source could emit in the blue region of the spectrum (e.g., between about 360 nm to 460 nm inclusive) or in the ultraviolet (UV) spectrum (e.g., between about 200 nm to 360 nm). Such a light source is paired with NFT designs that can provide improved thermal gradient together with high reliability.

In reference now to FIG. 1, a perspective view shows a recording head 100 according to an example embodiment. The recording head 100 may be used in a magnetic data storage device, e.g., HAMR hard disk drive. The recording head 100 may also be referred to herein interchangeably as a slider, head, write head, read head, read/write head, etc. The recording head 100 has a slider body 102 with read/write transducers 108 at a trailing edge 104 that are held proximate to a surface of a magnetic recording medium (not shown), e.g., a magnetic disk.

The illustrated recording head 100 is configured as a HAMR device, and so includes optical components that form a hot spot on the recording medium near the read/write transducers 108. These HAMR components include an energy source 106 (e.g., laser diode) mounted to the slider body 102 and a waveguide 110 (e.g., a dielectric waveguide) integrated into the slider body 102. The waveguide 110 delivers electromagnetic energy from the energy source 106 to a near-field transducer (NFT) that is part of the read/write transducers 108. The NFT achieves surface plasmon resonance and directs the energy out of a media-facing surface 112 (also referred to herein as an air-bearing surface, or ABS) to create a small hot spot in the recording medium.

The energy source 106 may be a laser diode that emits energy in the visible blue range, visible violet range, or ultraviolet range. Generally, this may include wavelengths in the range 200 nm to 460 nm. Relatively inexpensive blue wavelength lasers are commercially available, e.g., as used in BluRay optical players and recorders which use 405 nm laser diodes. While the energy source 106 may be mounted on a top surface of the slider body 102 as shown, other mounting configurations are possible. For example, a laser diode could be mounted to the trailing edge 104 of the slider body 102 where it couples with the waveguide 110.

Figure 2:
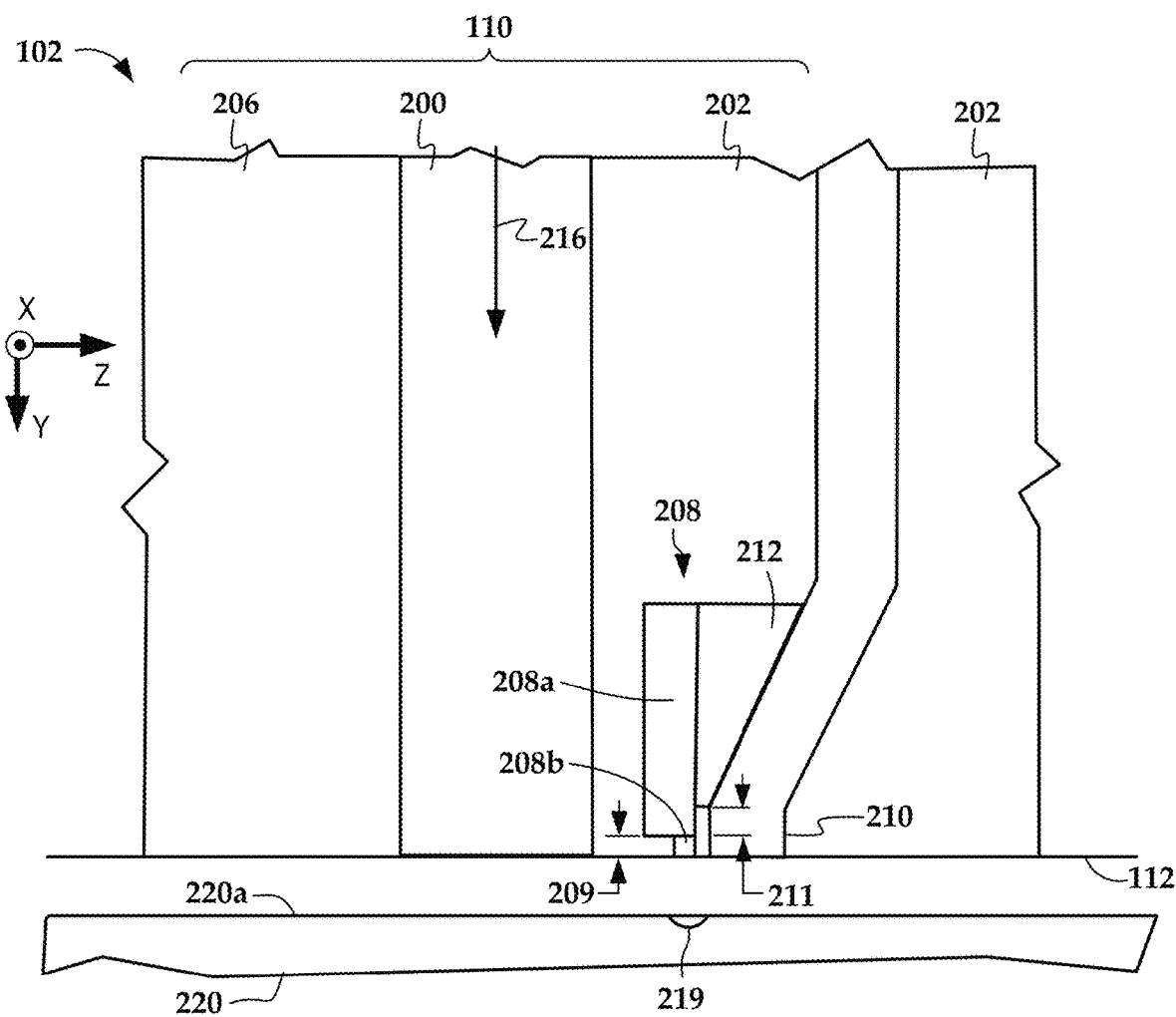
FIG. 2 is a cross-sectional view of a slider body along a down-track plane according to according to an example embodiment.

In FIG. 2, a cross-sectional view shows details of a slider body 102 according to an example embodiment. The waveguide 110 includes a core 200, top cladding layer 202 and bottom cladding 206. Other cladding layers not shown in this figure may be used with this waveguide 110, such as middle and side cladding. The core 200 delivers light to an NFT 208 that is located at the media-facing surface 112. A write pole 210 (also referred to herein as a "magnetic pole") is located near the NFT 208. A heat sink disc (HDSC) 212 may be used to thermally couple the NFT 208 to the write pole 210.

A magnetic coil (not shown) induces a magnetic field through the write pole 210 in response to an applied current. During recording, the waveguide 110 delivers light 216 from a light source to the NFT 208. The NFT 208 directs surface plasmons out of the media-facing surface 112 to form a hotspot 219 within a recording layer of a moving recording medium 220. The write pole 210 applies a magnetic field to the recording medium 220, which sets a magnetic orientation in the hotspot 219, thereby writing data to the recording medium 220.

In this configuration, the NFT 208 includes an enlarged part 208a and a peg 208b extending from the enlarged part 208a towards and normal to the media-facing surface 112. The enlarged part 208a (also referred to as a surface plasmon plate, or SPP) may be configured, for example, as a circular disk, rectangular plate, parabolic plate, etc. Peg 208b may have a rectangular, triangular, or other shape as seen normal to the media-facing surface 112. The NFT 208 may be made from a combination of materials as described herein, including different materials for the enlarged part 208a and peg 208b.

At short wavelengths, the NFT dimensions can be scaled down correspondingly, including peg break point 209 (pegBP) & recess of heat-sink disc 211 (HDSC_recess). The pegBP 209 is a distance that the peg 208b extends from the enlarged part 208a and the HDSC_recess 211 is a distance between a lower part of the HDSC 212 and the lower part of the enlarged part 208a. By decreasing the pegBP 209 and the heat-sink disc recess HDSC_recess, the peg is more efficiently heat-sinked by the large portion 208a and the heat-sink disc 212, lowering the peg temperature, if proper materials are chosen for the NFT such that there being little or no decrease in NFT efficiency. Note that the light absorption in the storage media is also significantly increased at short wavelengths. Lowering the pegBP 209 decreases the thermal resistance between the tip of the peg 208b and the enlarged part 208a, the latter acting as a heat sink.

The TG of the hotspot 219 depends on the transverse confinement of optical field on a given media. Thermal background from the near-field heating will set the upper limit on TG. In the far-field, light of short wavelengths provide better optical confinement. In the near-field, this improvement is less clear, because the electromagnetic field behaves like an electrostatic field. But the faster decay of evanescent waves, $\propto e^{-\alpha 2\pi/\lambda_0 d}$, along the transverse direction is expected to improve TG ($\lambda_0$—light wavelength). If the pegBP 209 is shortened, the thermal background from near-field heating is not expected to increase due to the faster decay of evanescent waves along the longitudinal direction at shorter wavelengths.

Figure 3:
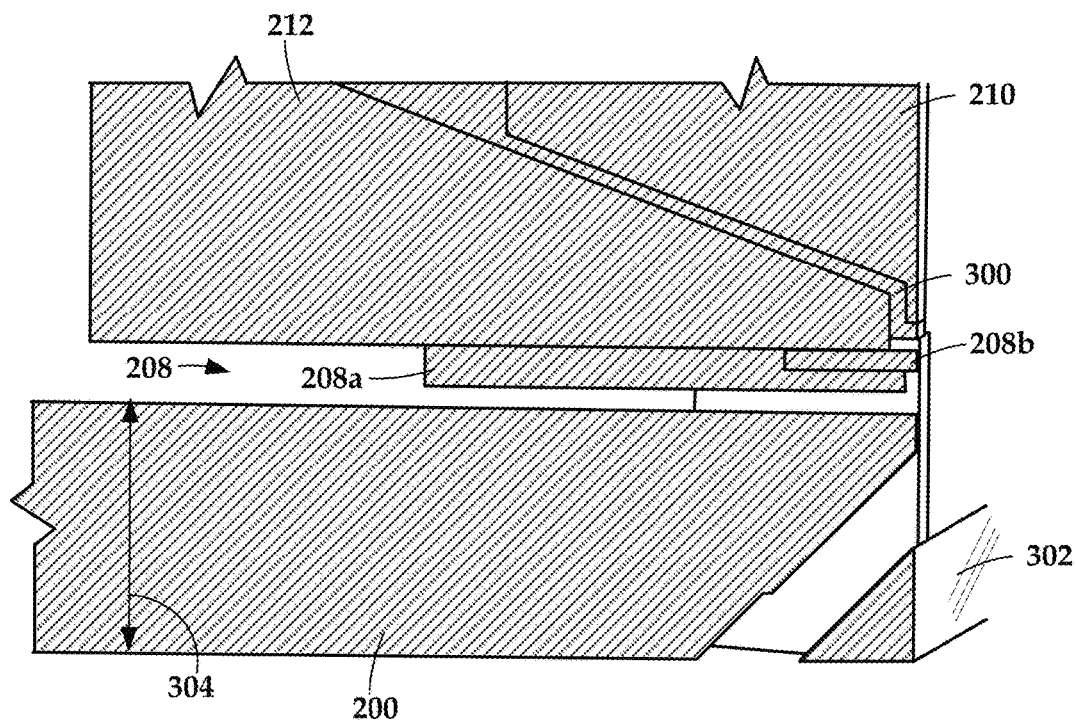
FIGS. 3, 4, and 5 are perspective cutaway views of a slider body according to an example embodiment.
Figure 4:
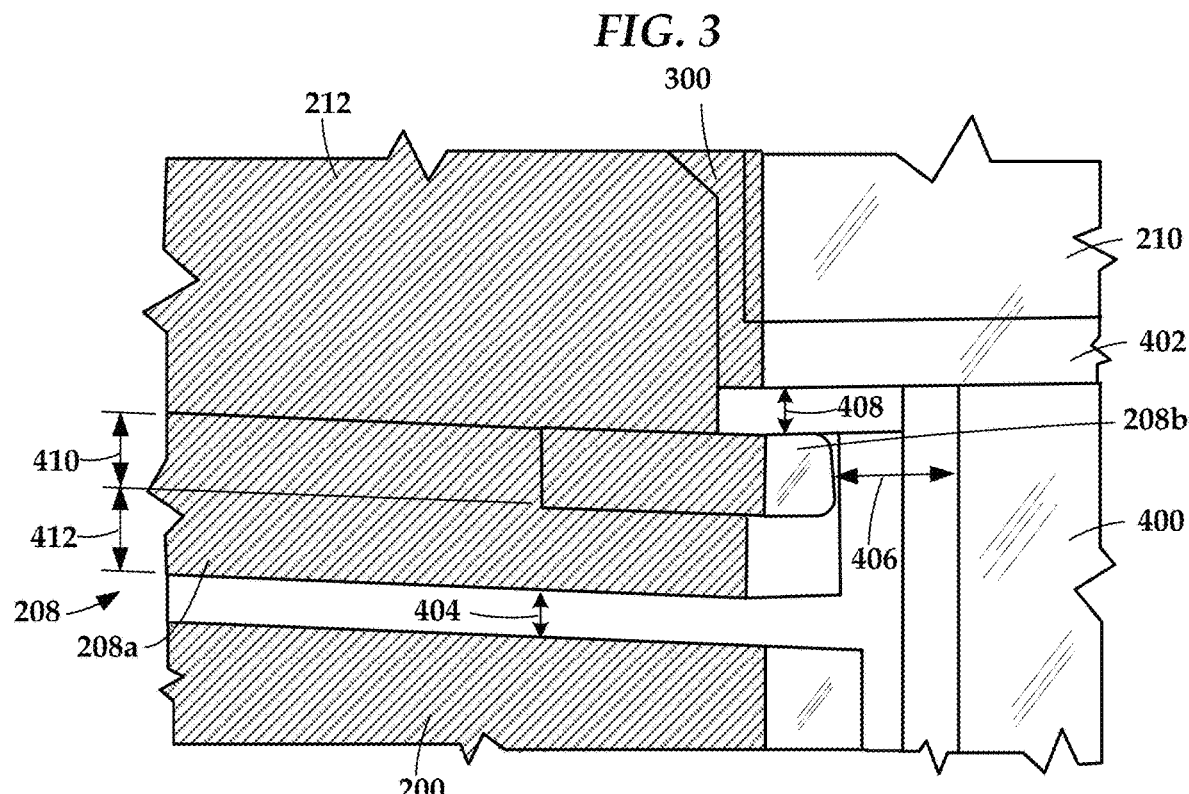
Figure 5:
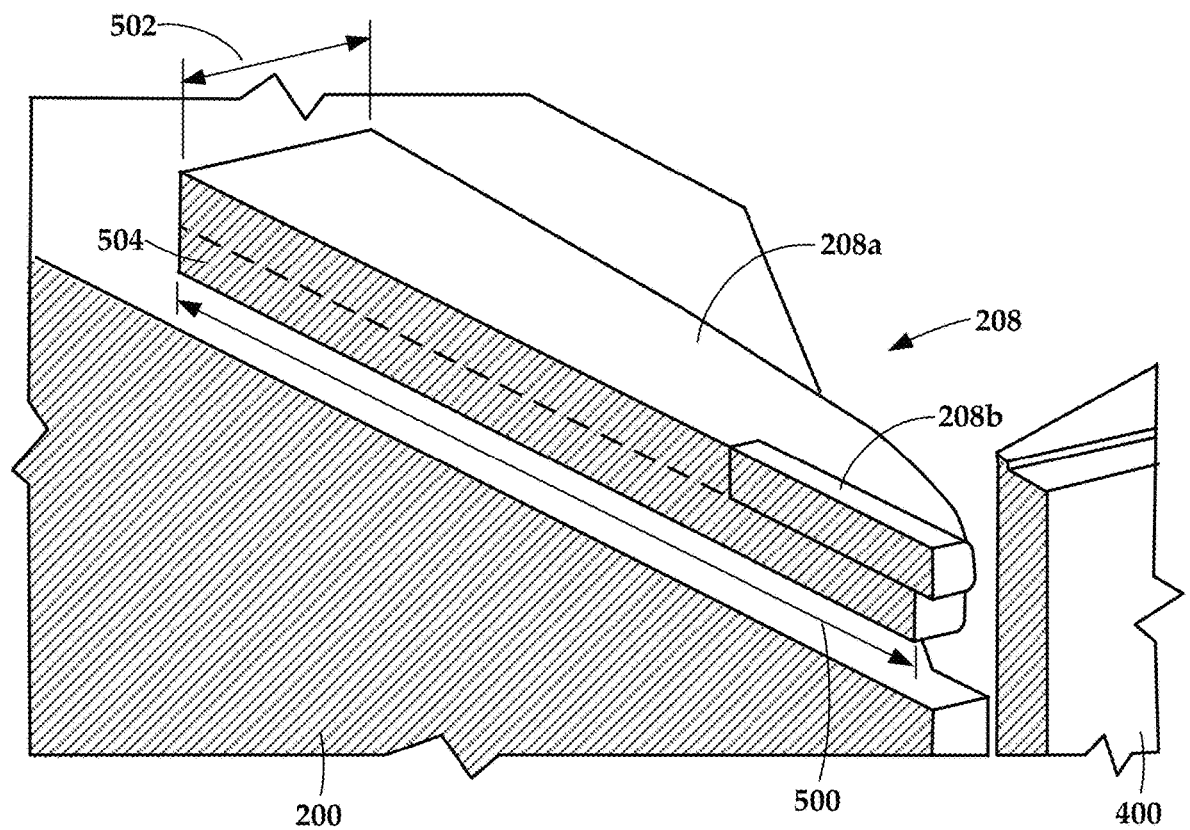

In reference now to FIGS. 3-5, perspective cross-sectional views show details of a NFT design according to an example embodiment. Note that in these figures, hatching is used to indicate the cross-sectional plane, and is not meant to indicate specific materials. Shading is used to indicate surfaces that are at or near the media-facing surface 112, and cladding and other surrounding materials are not shown. The diagrams in FIGS. 3-5 use reference numbers from previous figures, where peg 208b is shown embedded in and extending from enlarged part 208a. As best seen in FIG. 3, a diffusion barrier 300 is located between the HDSC 212 and write pole 210. A waveguide blocker 302 is shown that blocks emissions from a media-facing end of the waveguide core 200 and associated cladding (not shown). The core 200 in this example may be formed of TaOx.

As best seen in FIG. 4, an optical side shield (OSS) 400 is shown that surrounds crosstrack sides of the NFT 208. A peg coupler 402 is shown between the pole 210 and the peg 208b at the media-facing surface. Both the OSS 400 and peg coupler 402 may be made of the same material, e.g., Ru. In FIG. 5, the NFT 208 is shown with the components removed such as HDSC, write pole, etc., such that the parabolic shape of the enlarged part 208a can be seen.

Figure 6:
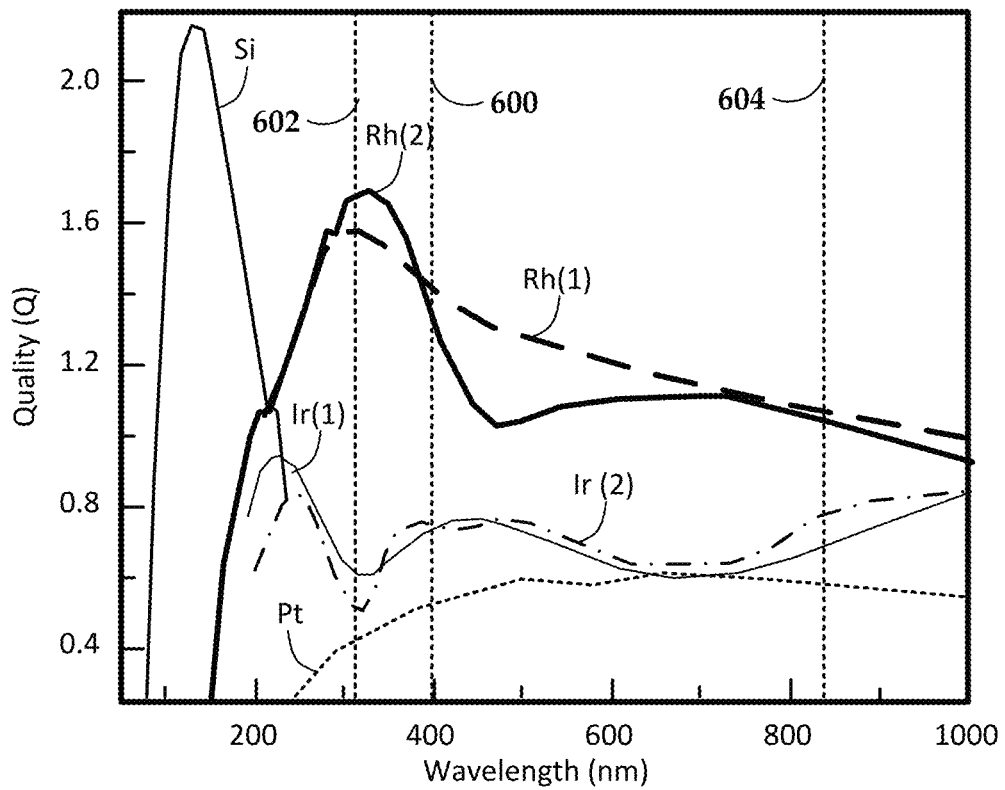
FIGS. 6-10 are graphs showing properties of materials suitable for use in a recording head according to example embodiments.

Recently the plasmonic properties of some metals (In, Mg, Al, Ag, Rh, Pd, etc.) and some semi-conductors (Si, Ge, Ga, GaAs, etc.) have been studied at blue and UV wavelengths. In FIG. 6, a graph shows plasmonic quality factor Q at a range of optical wavelengths for Rh, Ir, Pt, and Si that may be candidates for an NFT according to an example embodiment. Note that Ir(1), Ir(2) and Rh(1), and Rh(2) are results obtained from different experimental sources. The vertical lines 600, 602 represent an approximate range of blue wavelengths, and line 604 represents current energy source wavelength, 830 nm.

Figure 7:
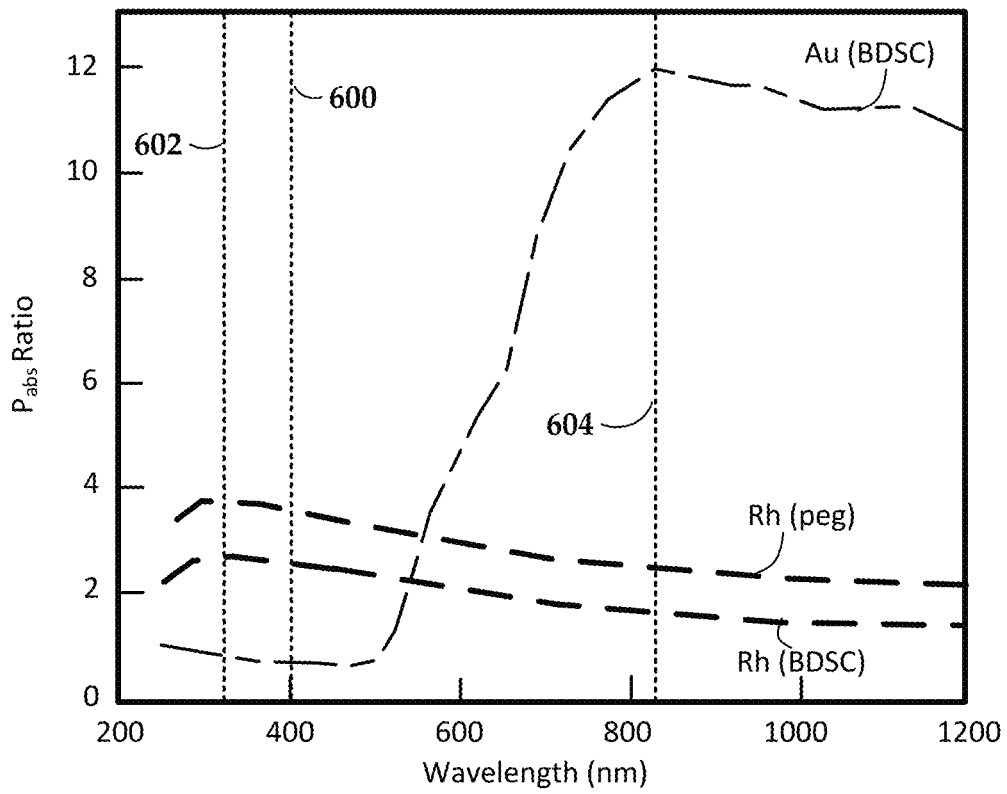

In FIG. 7, a graph shows the ratio of power absorption in a recording layer (RL) that is 20 nm thick, divided by that of Au or Rh at wavelength region 600, 602 for an NFT according to an example embodiment. For both materials, the power absorption is shown for a bottom disk (BDSC), which is a lower section of the NFT enlarged part (e.g., bottom disk portion 504 shown in FIG. 5). This power absorption ratio for an Rh peg is also shown.

Based on these results, Rh is a good candidate for a peg material. It has quality Q peaked at $\lambda_0 \sim 320$ nm. Silicon (Si) is also a good UV plasmonic material, with quality Q peaked at ~130 nm. But Si could get oxidized and form $SiO_2$ at the media-facing surface, impairing its performance over time. Absorption in RL grows faster at shorter wavelength than Rh, due to the strong dependence of skin depth of RL. So, as a rod/peg material, Rh around blue or UV wavelengths is better than at near infrared ($\lambda_0 \sim 830$ nm).

These results suggest that a recording head 100 using blue or UV wavelengths can achieve comparable or better TG and lower peg temperature than a similar recording head that uses near-infrared light to excite the NFT. For purposes of this disclosure, a similar recording head is understood to mean a HAMR recording head that utilizes the same components and features (e.g., surface plasmon plate, peg, bottom disc plate, NFT shape, peg coupler, optical side shields, delivery waveguide type, waveguide and NFT coupling modes, write pole) but may employ different materials, sizes, and aspect ratios that are optimized for the near-infrared excitation wavelength.

Figure 8:
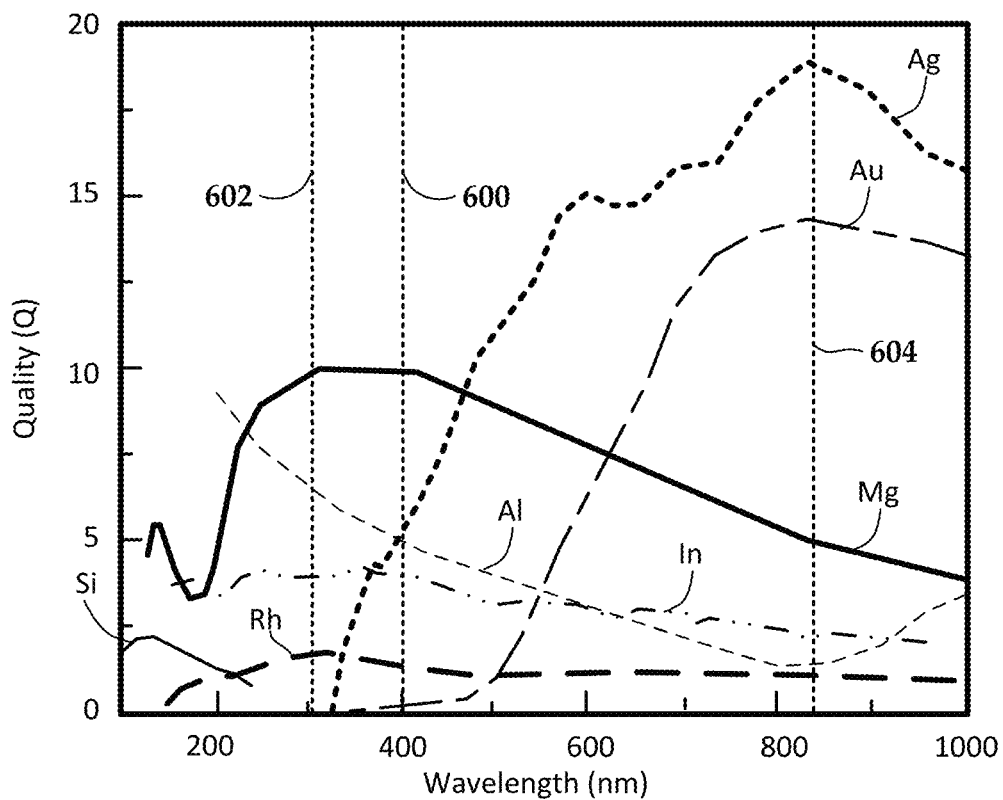
Figure 9:
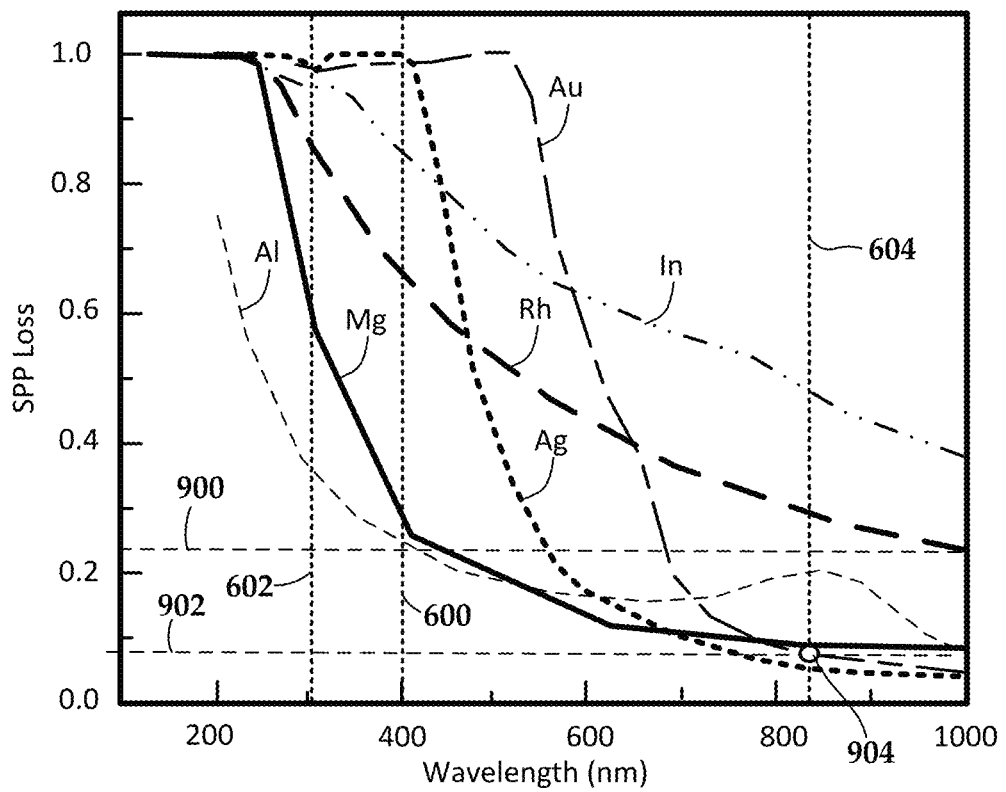

In FIGS. 8 and 9, graphs show material properties that may be used to form an NFT surface plasmon plate (SPP) according to an example embodiment. As seen in FIG. 8, the relative quality Q at blue wavelengths (~400 nm) is Mg>Al~Ag>Rh. At ~300 nm, Mg>Al>Rh. The SPP loss shown in FIG. 9 is defined as the power loss as surface plasmon polariton propagates one wavelength along metal/$Al_2O_3$ interface. A desired power loss range is indicated by horizontal lines 900, 902. At 830 nm, Au has a low power loss of 0.05, as indicated by point 904. At 400 nm, the following materials show the lowest power loss: Al 0.24; Mg: 0.3, Rh: 0.65, which is larger than that of Au at 830 nm light. This could present a challenge in obtaining a desired NFT efficiency even with Al or Mg. This analysis suggests Al or Mg (or alloys thereof) for the enlarged part of NFT and Rh (or alloys thereof) for the rod/peg are good candidates. The heat sink 212 (see FIG. 3) may also be formed of the same material as the enlarged part of the NFT, e.g., Al or Mg, or alloys thereof.

Figures 10, 11:
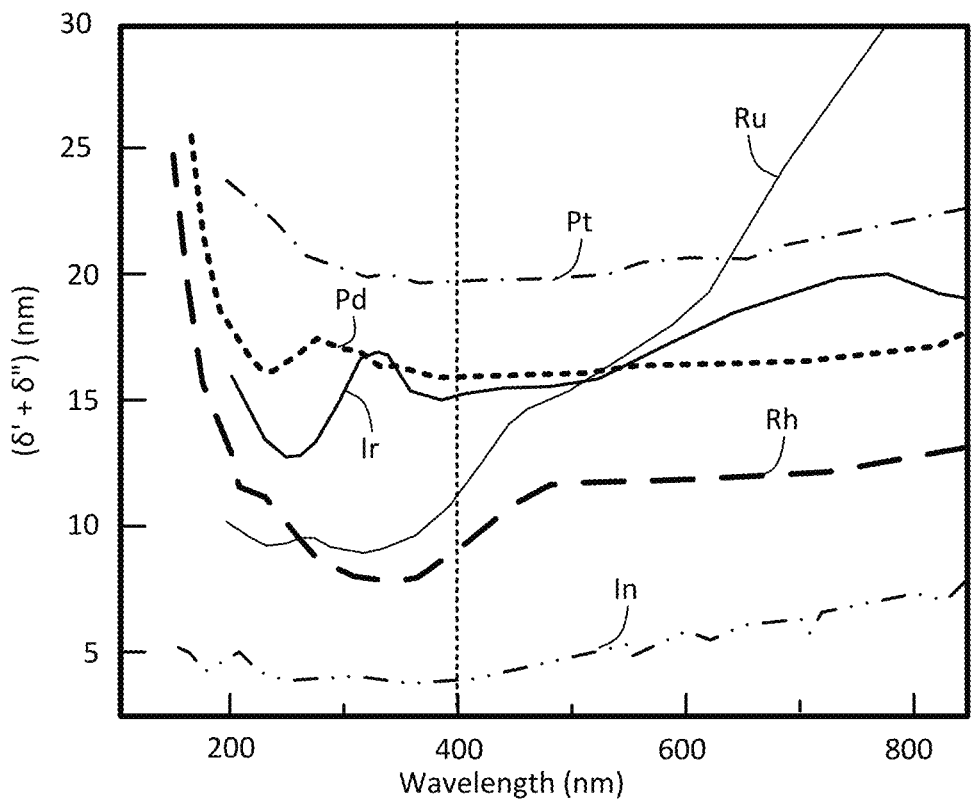
FIG. 11 is a table showing materials and dimensions of components of a recording head according to an example embodiment.

In addition to materials that efficiently propagate small wavelength light, the recording head will utilize materials that effectively absorb or block light in these wavelength ranges, such as the waveguide blocker 302 (see FIG. 3), side shields 400 and peg coupler 402 (see FIG. 4). In FIG. 10, a graph shows power absorption of a blocking structure according to an example embodiment. The power absorption and quality factor Q are shown in Equations (1) and (2) below. The terms of $\delta'/\delta''$ indicate real/imaginary part of skin depth. The resonance shift $\Delta \omega$ is shown in Equation (3), and is indicative of TG. Note that resonance blue-shift yields low peg temperature, but TG will be down for very short pegBP 209, due to higher near-field thermal background. Other factors that can affect the resonance blue-shift include thin peg-to-coupler spacing (gap dimension 408 in FIG. 4), and thin peg (peg height 410 in FIG. 4).

$$P_{abs} = \frac{Z_0 k_0}{4}(\delta' + \delta'') \quad (1)$$

$$Q = \frac{V}{S(\delta' + \delta'')} \quad (2)$$

$$\Delta \omega = -\frac{\omega_0}{2Q} \propto -(\delta' + \delta'') \quad (3)$$

For the waveguide blocker 302, the selected material should be selected to balance between optical power into NFT at writing condition (CPI) (preferably using low loss plasmonic material) and TG (preferably using high loss metal to mitigate the transverse magnetic field trapped between peg and core). For the side shield 400, the material is selected to cut-off the excitation. For the peg coupler, the material is selected to improve TG. Simulations showed that Ru is good for all of these components (waveguide blocker, side shield, and peg coupler). Rh might be used to form the peg coupler 402 for resonance blue shift in configurations with a thick peg 208b. Also note that Ru may be a good candidate for the diffusion barrier 300, as Ir has a relatively low melting point and Pt or Pd will diffuse into Au at high temperatures. Ru becomes plasmonic at blue light wavelengths ($\lambda_0 \approx 400$ nm), with a complex optical constant n=2.4+i 4.64.

In FIG. 11, a table shows some comparative sizes of features of a HAMR head according to an example embodiment. All dimensions are in nm. The terms in FIG. 11 are defined as follows, with reference numbers from FIG. 3-5 given in parentheses: SPP—surface plasmonic plate (208a); PSS—peg-side shield spacing (406); bdsc_x—crosstrack width of SPP (502 is bdsc_x/2); bdsc_y—length of SPP in light propagation direction (500); hBDSC—thickness of the bottom disc (412); PCS—peg-to-coupler gap spacing (408); HDSC_recess—heat sink disc recess (211); CNS—core-NFT spacing (404); pegBP—peg break point (209); OSS—optical side shield (400); WGB—waveguide blocker/funnel coupler (302). Note that the core thickness is the dimension 304 in FIG. 3 and the core width is the crosstrack width of the core (not shown).

If the material dispersion is disregarded, linear geometric dimension is expected to scale by a nominal factor proportional to the different wavelengths: 400/830≈0.5, from the near-infrared ($\lambda_0$=830 nm) to the blue light ($\lambda_0$=400 nm). The results shown in FIG. 10 are based on numerical optimization of the indicated dimensions. The SPP width (bdsc_x) scales more than the nominal factor, from 400 to ~100 nm. The hBDSC is also scales significantly more than nominal factor, from 40 to ~12 nm. The PCS does not scale correspondingly, remaining roughly the same in both cases.

The indicated changes in dimensions should help reduce peg temperature. The pegBP is halved, which is a parameter whose reduction can significantly reduce peg temperature rise. The HDSC_recess is also halved, which is favorable for peg temperature reduction. Also note that the HDSC recess is about twice the pegBP distance at the blue wavelength.

The SPP dimension becomes smaller, reducing its capability to diffuse heat from the peg, +~15 K. However, it is difficult to estimate the impact of temperature rise in the SPP itself from its own absorption.

The indicated changes in dimensions should also improve TG. A thin CNS and sunken SPP (hBDSC) renders a higher transverse magnetic (TM) field trapped between the peg and core, which will reduce TG. This may be the reason the PCS does not scale correspondingly in the numerical analysis.

Figure 12:
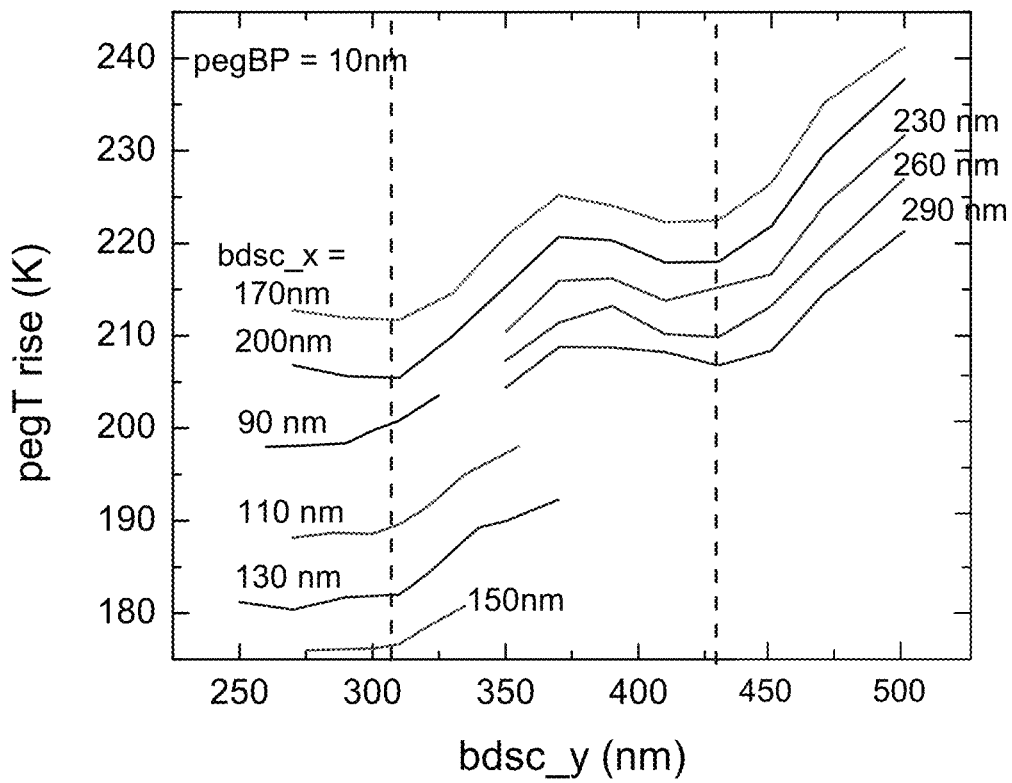
FIGS. 12-14 are graphs showing optimization of surface plasmon plate dimensions according to example embodiments.
Figure 13:
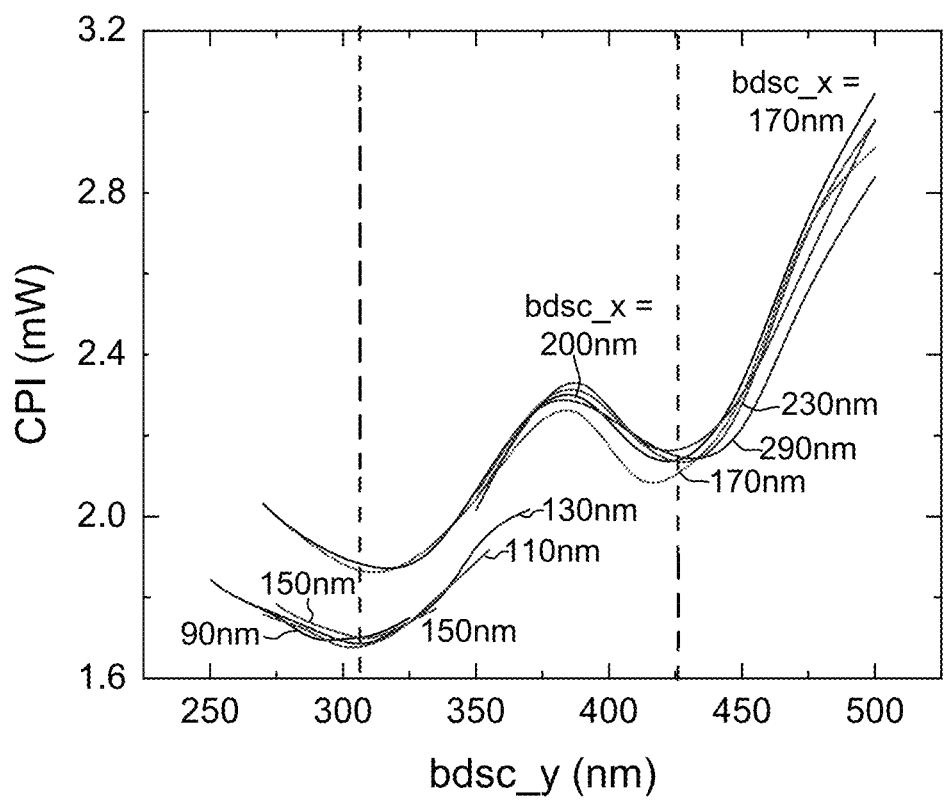
Figure 14:
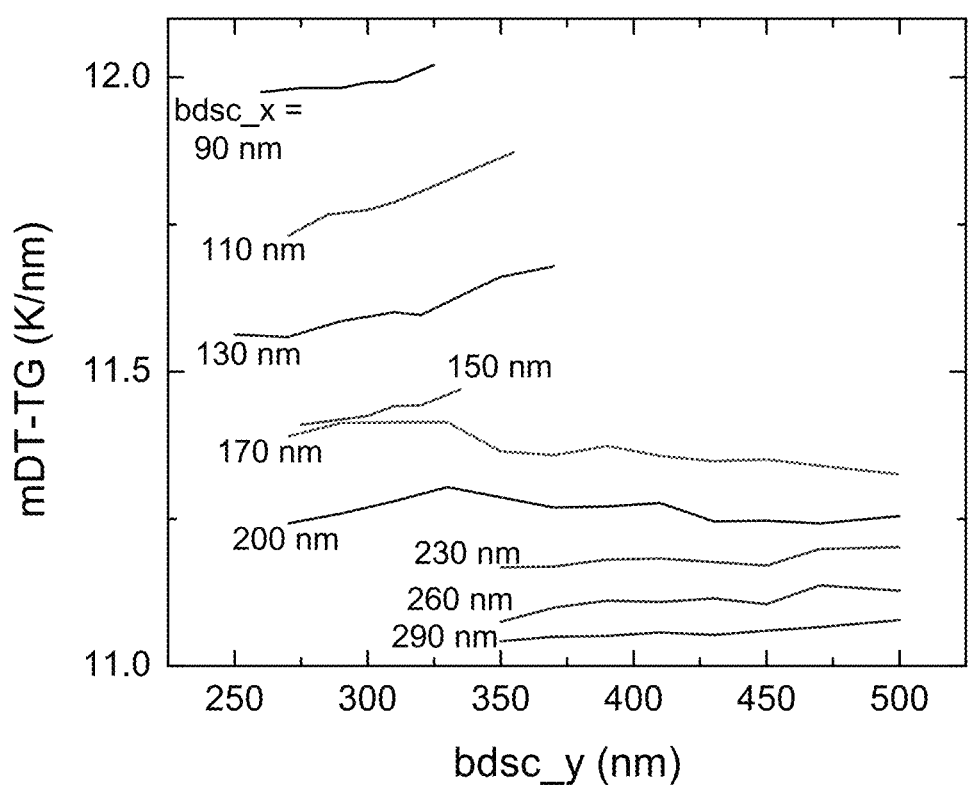

In FIGS. 12-14, graphs show an optimization of the SPP dimensions according to example embodiments. For these analyses, CNS=15 nm, hBDSC=20 nm, PSS=70 nm, pegBP=10 nm; peg width=23 nm; and peg height=12 nm. As seen in FIG. 12, peg temperature (pegT) is minimal at bdsc_x=150 nm. At the chosen bdsc_x=100 nm, pegT penalty is 10-15 K. The CPI shown in FIG. 13 has two local minima, one at bdsc_y=450 nm (the expected scaling) and the other one at bdsc_y=~310 nm. As seen in FIG. 14, downtrack thermal gradient in the media (mDT-TG) increases with smaller bdsc_x, which is well-scaled from $\lambda_0$=830 nm. The value of bdsc_x=100 nm is chosen for TG at narrow OSS crosstrack opening, based on TG vs pegT.

Figure 15:
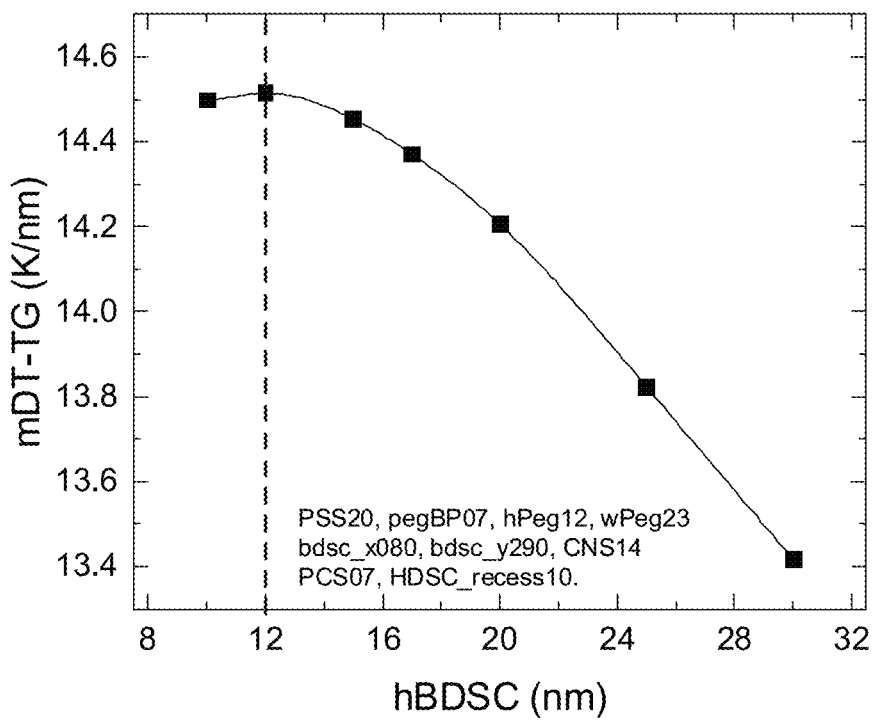
FIGS. 15 and 16 are graphs showing optimization of bottom disc dimensions according to example embodiments.
Figure 16:
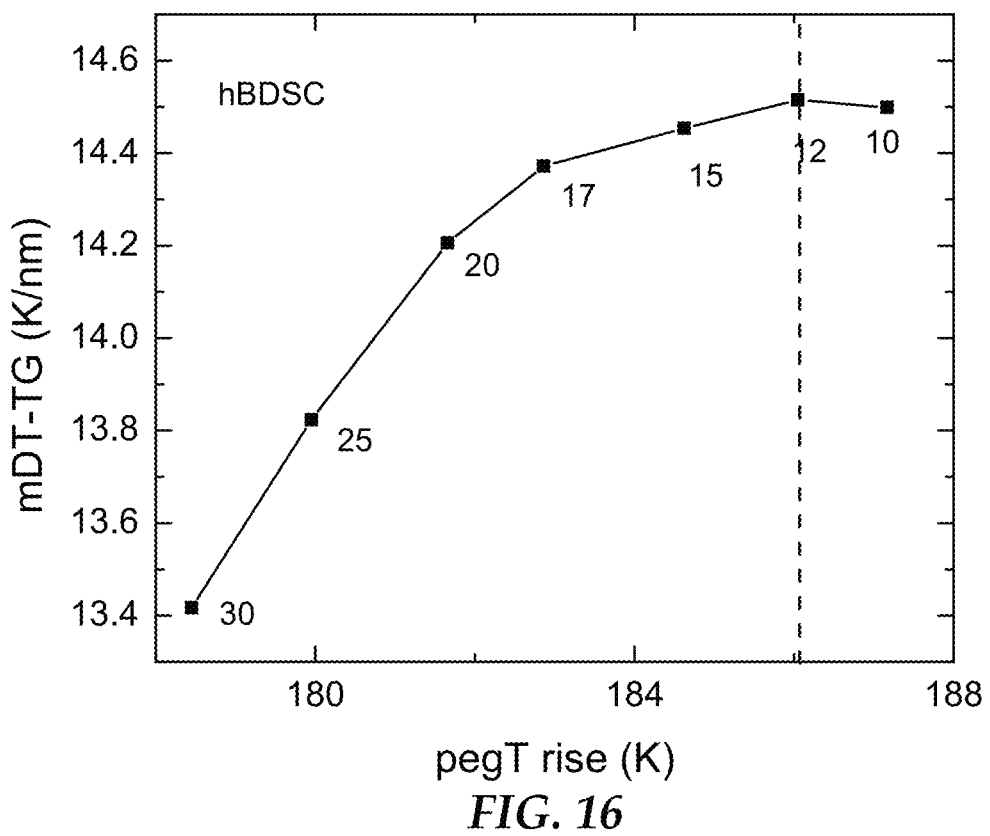

In FIGS. 15 and 16, graphs show optimization of bottom disc thickness (hBDSC) for an NFT according to example embodiments. For these analyses, CNS=14 nm; bdsc_x=80 nm; bdsc_y=290, PSS=20 nm, pegBP=7 nm; peg width wPeg=23 nm; peg height=12 nm, PCS=7 nm; and HDSC_recess=10 nm. The optimal value of hBDSC is 12 nm at PSS=20 nm, which provides a significant contribution to TG.

Figure 17:
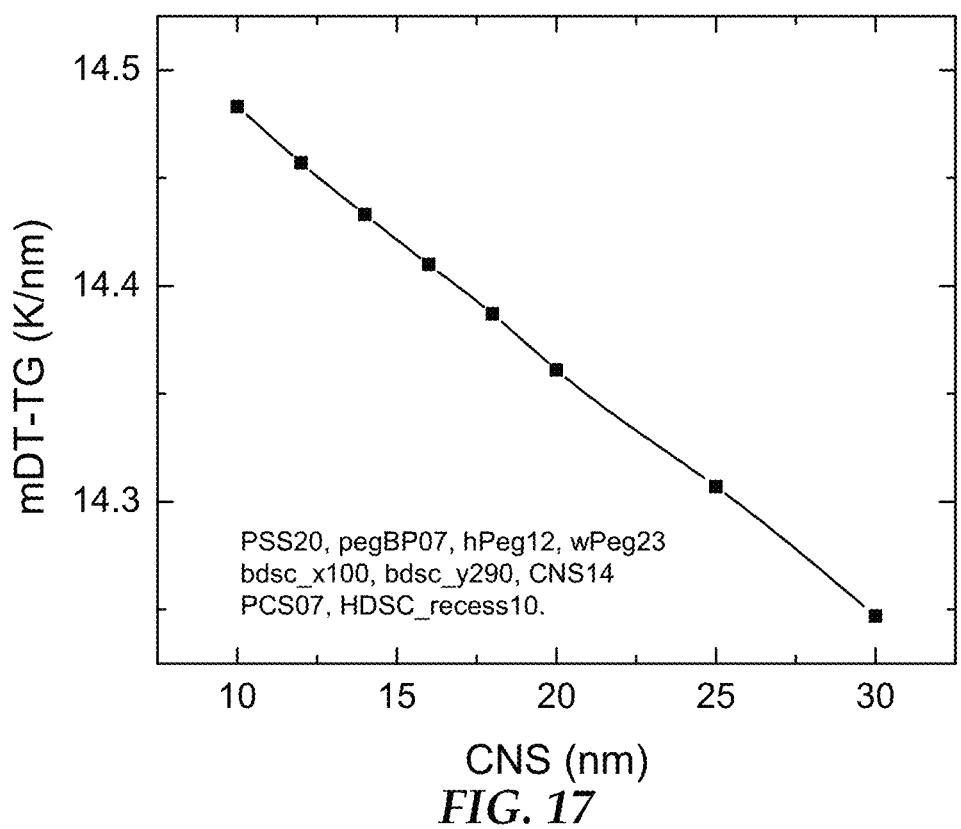
FIGS. 17 and 18 are graphs showing optimization of core to near-field transducer spacing according to example embodiments.
Figure 18:
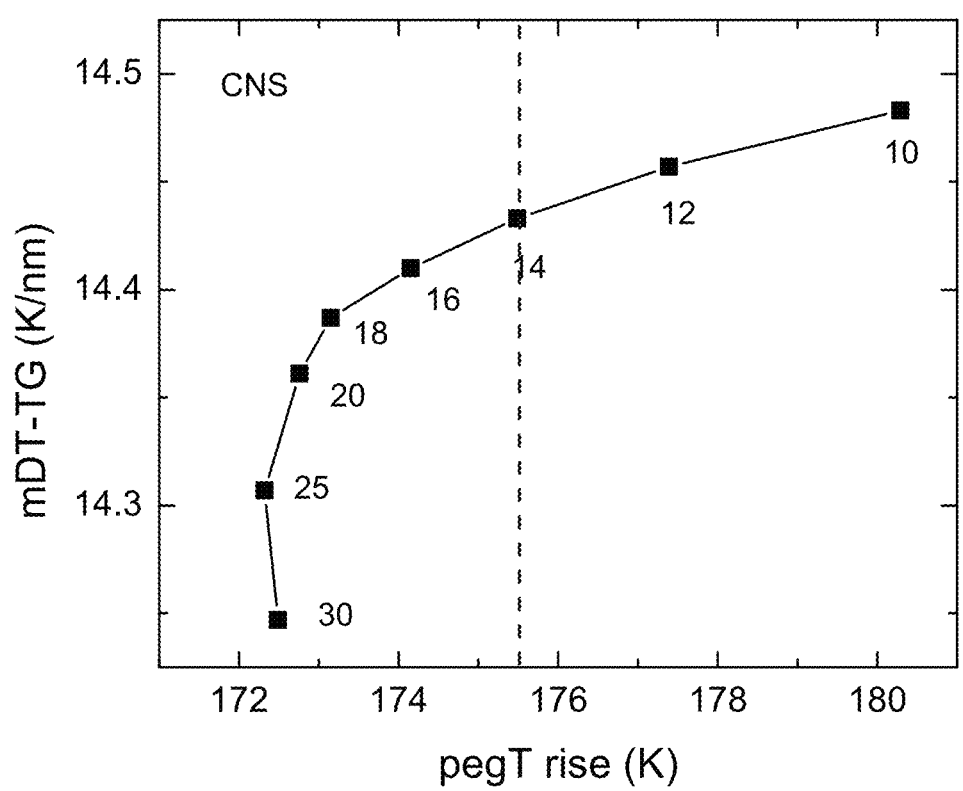

In FIGS. 17 and 18, graphs show optimization of core to NFT spacing (CNS) for a write head according to example embodiments. For these analyses, bdsc_x=100 nm; bdsc_y=290, PSS=20 nm, pegBP=7 nm; peg width wPeg=23 nm; peg height=12 nm; PCS=7 nm; CNS=14 nm; and HDSC_recess=10 nm. The mDT-TG almost linearly increases with decreasing CNS. But the impact to TG is small. A value of CNS=14 nm is chosen, based on TG vs pegT.

Figure 19:
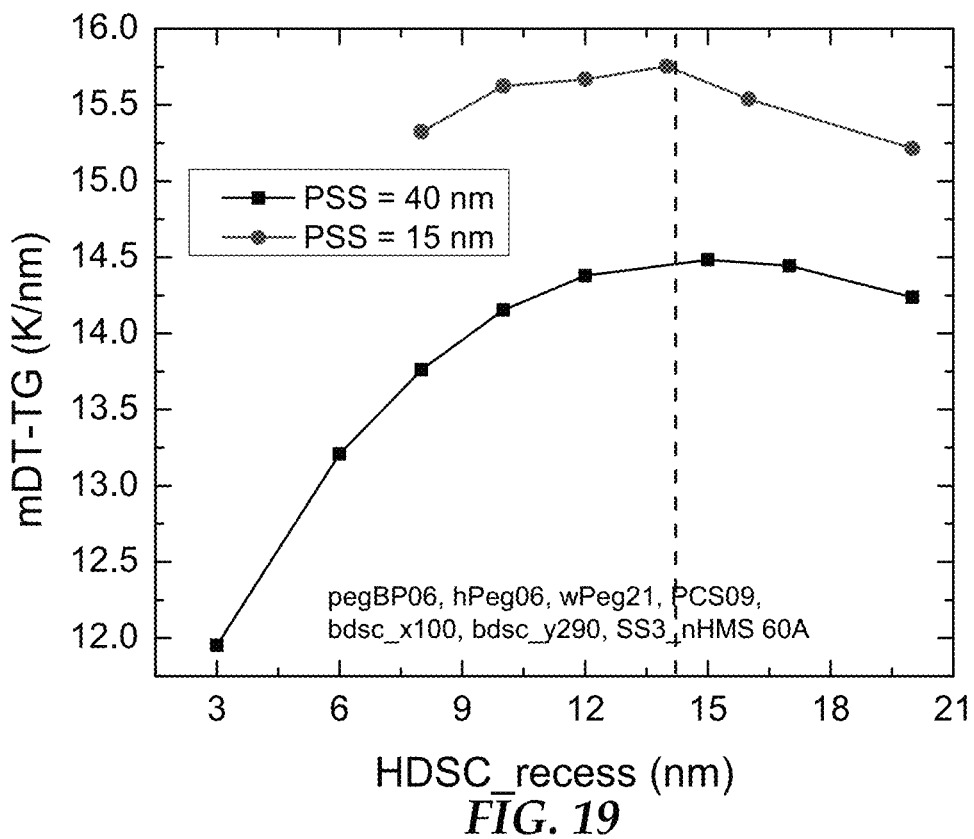
FIGS. 19 and 20 are graphs showing optimization of heat sink recess according to example embodiments.
Figure 20:
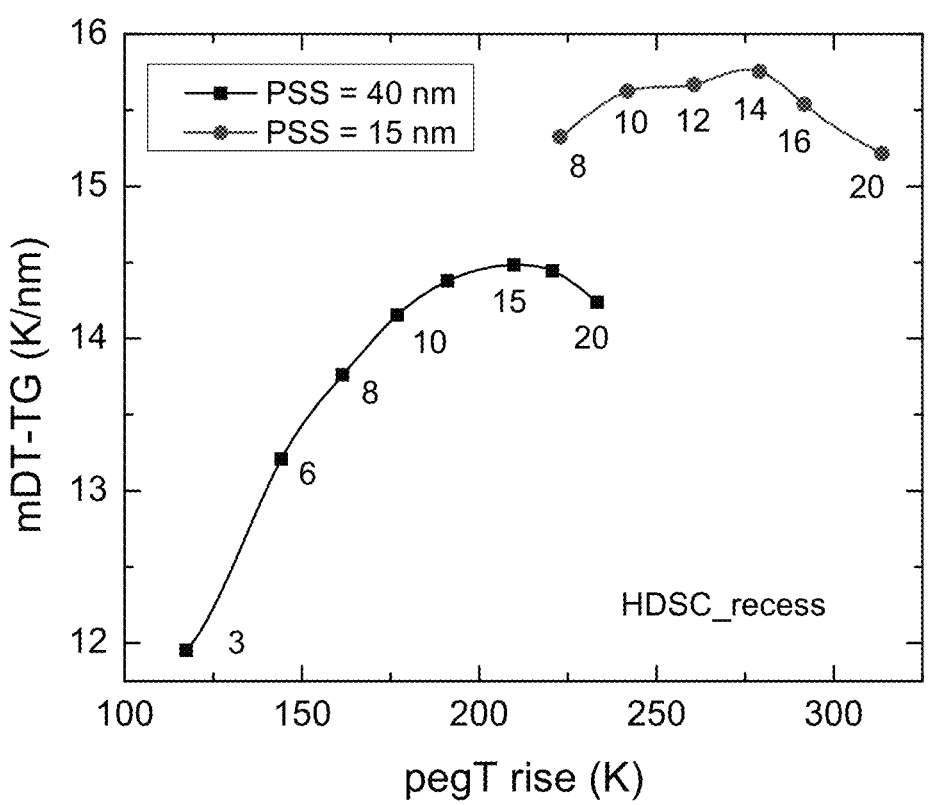

In FIGS. 19 and 20, graphs show optimization of heat sink recess (HDSC_recess) for a write head according to example embodiments. For these analyses, bdsc_x=100 nm; bdsc_y=290, PCS=9 nm, pegBP=6 nm; peg width=21 nm; peg height hPeg=6 nm; and head media spacing (HMS) is 60 angstroms. The optimal HDSC_recess is at 15-12 nm, depending on PSS. Narrowing the OSS crosstrack opening does not cause a substantial gain in TG.

Figure 21:
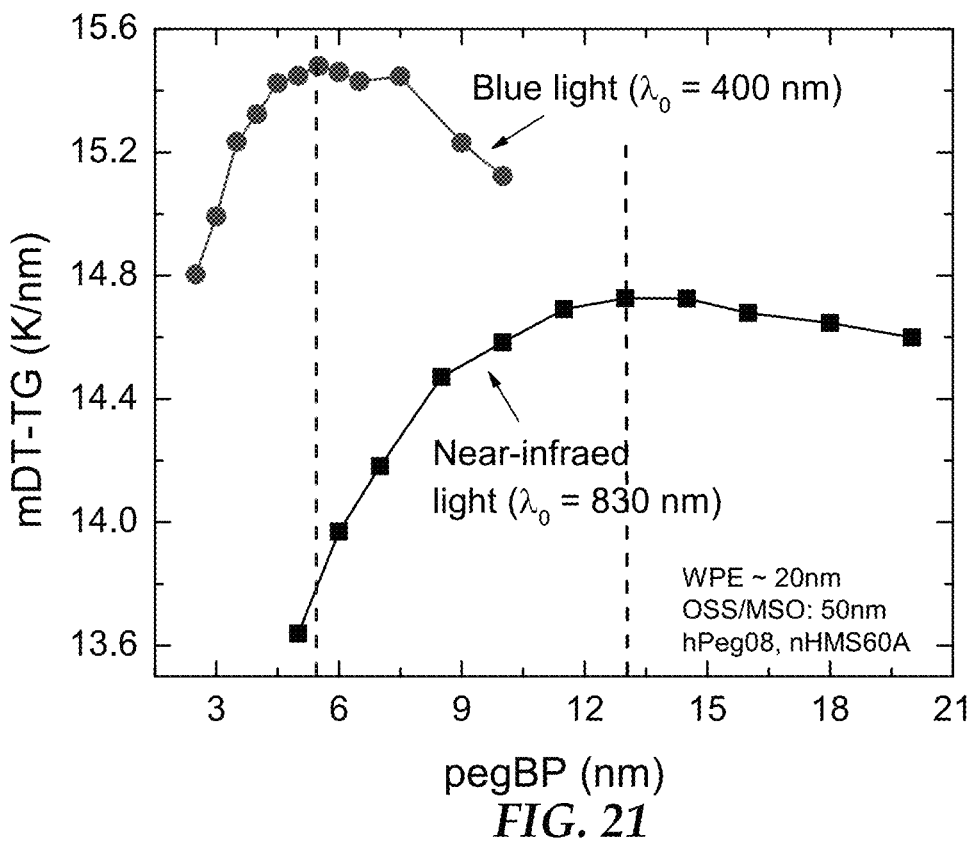
FIGS. 21 and 22 are graphs showing optimization of near-field transducer spacing peg break point according to example embodiments.
Figure 22:
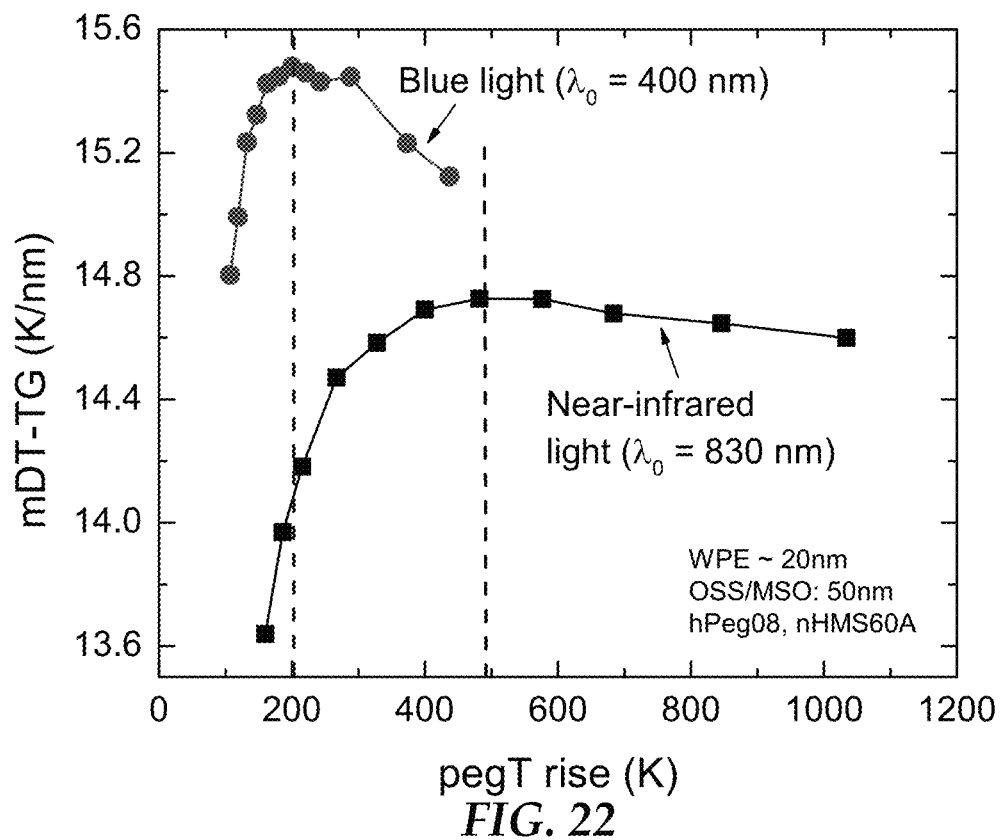
Figure 23:
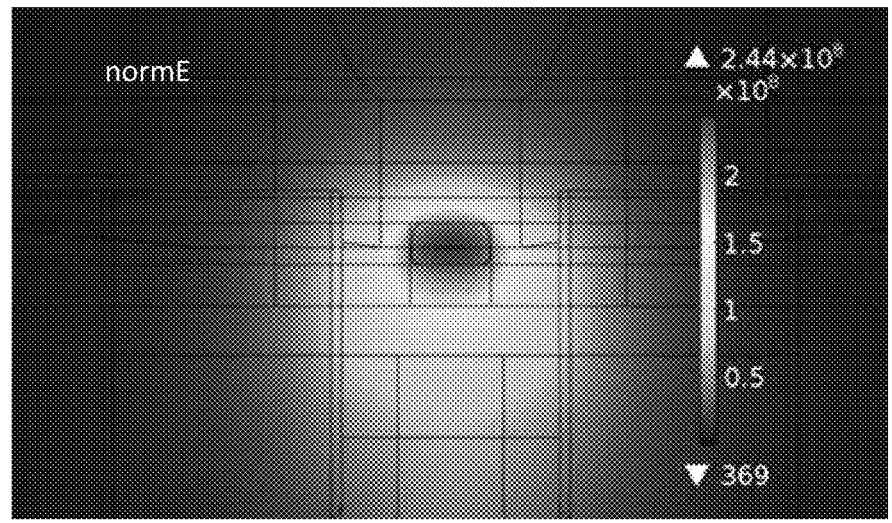
FIGS. 23-27 are plots showing numerical analysis of electromagnetic fields of a recording head according to an example embodiment.
Figure 24:
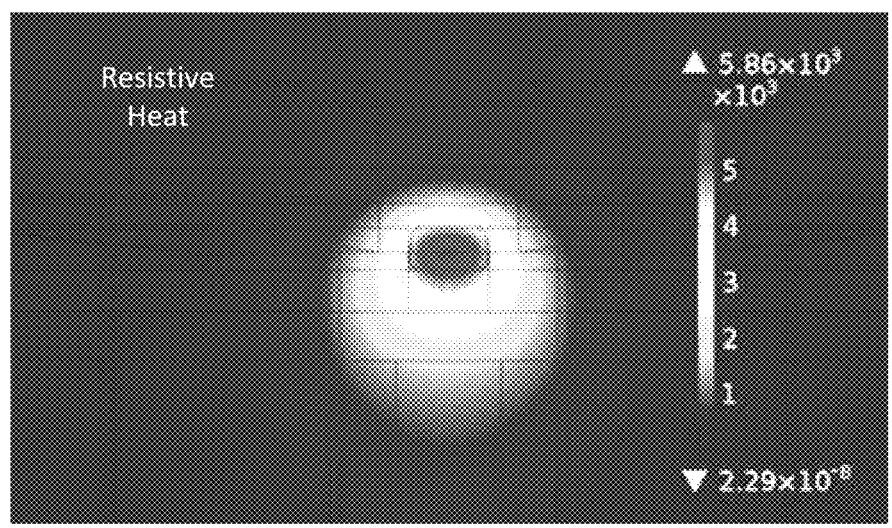
Figure 25:
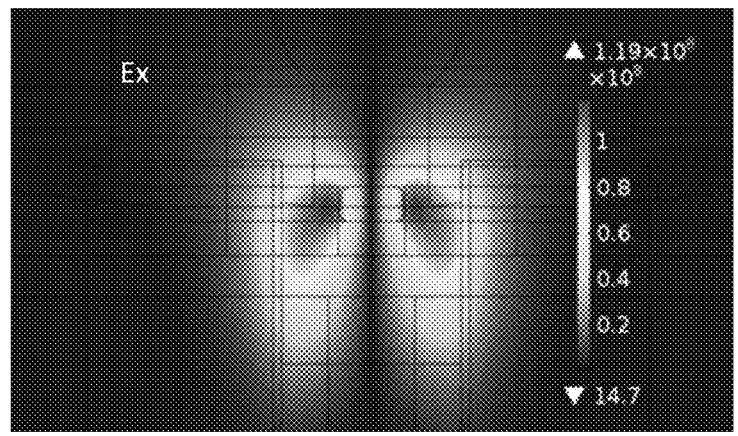

In FIGS. 21 and 22, graphs show scaling of peg breakpoint for different wavelengths according to example embodiments. At blue light wavelengths, mDT-TG is peaked at pegBP of 5-6 nm, halved from the near-infrared light, providing significant reduction in pegT. The optimal HDSC_recess is also halved, from ~30 nm at the near-infrared to ~14 nm at blue light, providing additional pegT reduction. A gain in TG at the blue light is also seen, ~0.8 K/nm. For the blue light laser write head, the NFT uses an Rh peg/rod with an Al SPP. The excitation is $TM_{00}$ excitation, peg height hPeg=8 nm, peg width=21 nm, OSS crosstrack opening=50 nm, HDSC_recess=14 nm, and PCS=9 nm.

Figure 26:
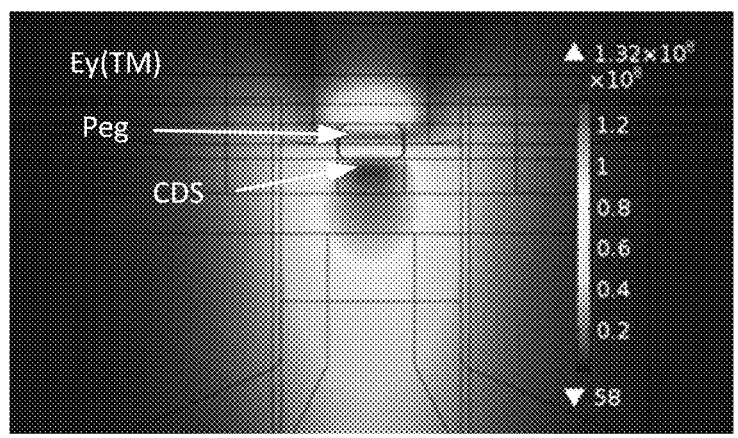
Figure 27:
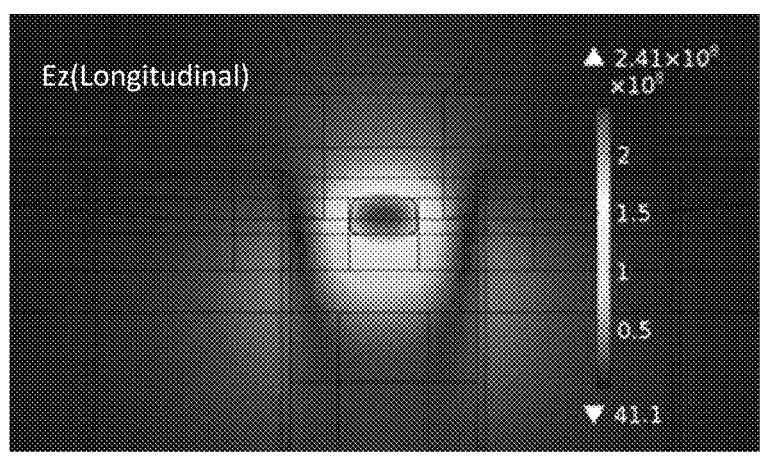

In FIGS. 23-27, field plots show simulation results for a HAMR head according to an example embodiment. The geometry parameters for this example are: peg width wPeg=22 nm, peg height hPeg=12 nm, peg length pegBP=7 nm, Ru peg coupler/diffusion barrier, PCS=7 nm, HDS-C_recess=10 nm, Ru_OSS with crosstrack gap PSS=20 nm, Ru_WGB, bdsc_x=100 nm, bdsc_y=290 nm, hBDSC=12 nm; CNS=14 nm, core height=150 nm, and core width=300 nm. As seen in FIG. 26, the TM component is larger at the bottom of peg, so are the charges. This is due to small CNS, which is reduced from 30 to 14 nm compared to a near-infrared design, and small sunken thickness, which is reduced from 50-40 to 12 nm compared to a near-infrared design.

Figure 28:
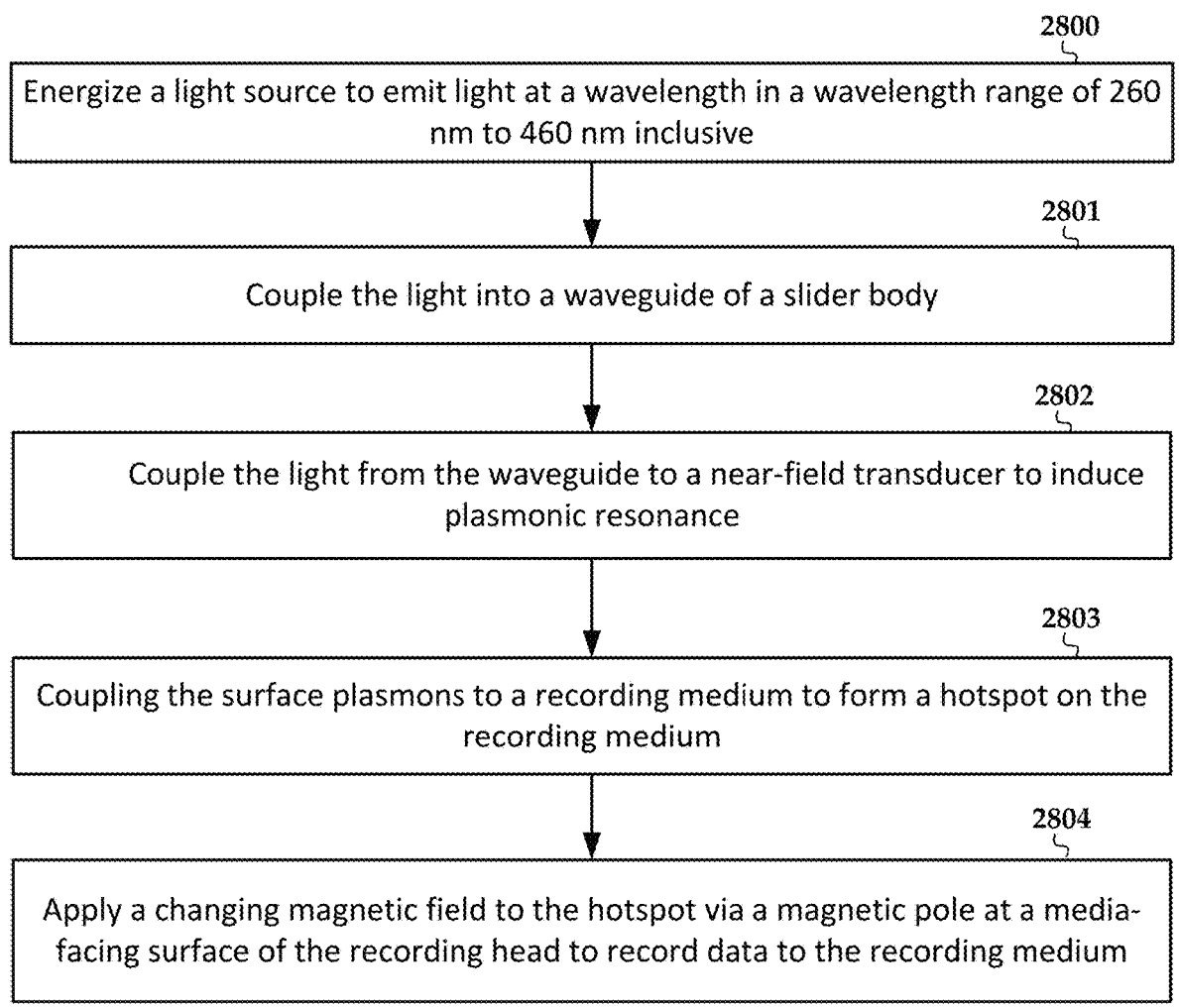
FIG. 28 is a flowchart of a method according to an example embodiment.

In FIG. 28, a flowchart illustrates a method according to an example embodiment. The method involves energizing 2800 a light source to emit light at a wavelength in a wavelength range of 260 nm to 460 nm inclusive. The light is coupled 2802 from the waveguide to a near-field transducer to induce plasmonic resonance. The near-field transducer includes a surface plasmon plate and a peg extending from the surface plasmon plate. The surface plasmon plate may be formed of a first material having a first plasmonic Q-factor above 5 in the wavelength range, and the peg is formed of a second material having a second Q-factor above 1.2 in the wavelength range. The peg may extending from the surface plasmon plate by a break point distance that facilitates recording at a comparable thermal gradient and lower peg temperature compared to a similarly configured recording head that uses near-infrared light. The surface plasmons are coupled 2803 to a recording medium to form a hotspot on the recording medium. A changing magnetic field is applied 2804 to the hotspot via a magnetic pole at a media-facing surface of the recording head to record data to the recording medium.

In summary, at blue wavelengths and shorter, Rh (or alloys thereof) is the preferred peg material, with material Q peaked at ~310 nm, greater than at current 830 nm light. For the SPP materials, Al (or Mg, In, or alloys thereof). For the waveguide blocker, side shield, and peg coupler/diffusion barrier, Ru is the preferred material. At short wavelengths, absorption in RL is faster than that in Rh. The dimension of waveguide and NFT will be scaled down correspondingly compared to a near infrared HAMR head, (including pegBP and HDSC_recess, if disregarding the material dispersion) an opportunity to lower pegT rise for reliability. Evanescent waves decay faster so, short peg break point will not experience more thermal background, which is a limiter on TG. A TG improvement is demonstrated, due to the faster decay of evanescent waves in transverse direction.

The numerical modeling on a NFT, that includes an Rh rod/peg and Al SPP, excited by a $TM_{00}$ mode by blue light demonstrates significant peg temperature reduction (~200 K), due to the halved peg breakpoint and HDSC recess. This design also exhibits low CPI, due to short peg point and higher absorption in RL. The downtrack TG exhibits a ~1 K/nm improvement.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative.

What is claimed is:

1. A recording head comprising:
   a light source that emits light at a wavelength in a wavelength range of 260 nm to 460 nm inclusive; and
   a slider body comprising:
   a magnetic pole extending to a media-facing surface of the recording head; and
   integrated photonics that deliver the light to a recording medium, the integrated photonics comprising:
   a waveguide that couples the light from the light source to the media-facing surface of the slider; and
   a near-field transducer coupled to receive the light from the waveguide, the near-field transducer comprising a surface plasmon plate and a peg extending from the surface plasmon plate, the surface plasmon plate formed of a first material having a first plasmonic quality factor (Q-factor) above 5 in the wavelength range, the peg formed of a second material having a second Q-factor above 1.2 in the wavelength range.

2. The recording head of claim 1, wherein the peg is formed of Rh or an alloy thereof.

3. The recording head of claim 1, wherein the surface plasmon plate is formed of Al, Mg, In, or an alloy thereof.

4. The recording head of claim 1, wherein the peg extends from the surface plasmon plate by a break point distance that facilitates recording at a comparable thermal gradient and lower peg temperature compared to a comparable recording head that uses near-infrared light.

5. The recording head of claim 4, wherein the break point distance of the peg is less than 10 nm.

6. The recording head of claim 1, wherein the surface plasmon plate is between 75 nm and 150 nm in a crosstrack direction and between 250 nm and 350 nm in a light propagation direction.

7. The recording head of claim 1, further comprising optical side shields on either crosstrack side of the peg, the optical side shield being formed of Ru or an alloy thereof.

8. The recording head of claim 1, further comprising a peg coupler between the peg and the magnetic pole, the peg coupler separated from the peg by a gap and being formed of Ru or an alloy thereof.

9. The recording head of claim 1, further comprising a heat sink between the surface plasmon plate and the magnetic pole, the heat sink formed of Al, In, or Mg, or an alloy thereof.

10. The recording head of claim 9, further comprising a diffusion barrier between the heat sink and the write pole, the diffusion barrier formed of Ru.

11. The recording head of claim 9, wherein the heat sink is recessed from the media facing surface by a distance that is at least twice that of a break point distance of the peg, the peg extending from the surface plasmon plate by the break point distance.

12. The recording head of claim 1, wherein the waveguide is formed of TaOx.

13. A recording head comprising:
    a light source that emits light at a wavelength in a wavelength range of 260 nm to 460 nm inclusive; and
    a slider body comprising:
    a magnetic pole extending to a media-facing surface of the recording head; and
    integrated photonics that deliver the light to a recording medium, the integrated photonics comprising:
    a waveguide that couples the light from the light source to the media-facing surface of the slider; and
    a near-field transducer coupled to receive the light from the waveguide, the near-field transducer comprising a surface plasmon plate and a peg extending from the surface plasmon plate, wherein the surface plasmon plate is between 75 nm and 150 nm in a crosstrack direction and between 250 nm and 350 nm in a light propagation direction.

14. The recording head of claim 13, wherein the peg is formed of Rh or an alloy thereof.

15. The recording head of claim 13, wherein the surface plasmon plate is formed of Al, In, Mg, or an alloy thereof.

16. The recording head of claim 13, further comprising optical side shields on either crosstrack side of the peg, the optical side shield being formed of Ru or an alloy thereof.

17. The recording head of claim 13, further comprising a peg coupler between the peg and the magnetic pole, the peg coupler separated from the peg by a gap and being formed of Ru or an alloy thereof.

18. The recording head of claim 13, further comprising:
    a heat sink between the surface plasmon plate and the magnetic pole, the heat sink formed of Al or Mg, or an alloy thereof; and
    a diffusion barrier between the heat sink and the write pole, the diffusion barrier formed of Ru, wherein the heat sink is recessed from the media facing surface by a distance that is at least twice that of a break point distance of the peg, the peg extending from the surface plasmon plate by the break point distance.

19. The recording head of claim 13, wherein the break point distance of the peg is less than 8 nm.

* * * * *